United States Patent [19]

Hlavach

[11] Patent Number: 4,700,977

[45] Date of Patent: Oct. 20, 1987

[54] MOVABLE MOLDING FOR A VEHICLE

[75] Inventor: Mark C. Hlavach, Sterling Heights, Mich.

[73] Assignee: Chrysler Motors Corporation, Highland Park, Mich.

[21] Appl. No.: 939,195

[22] Filed: Dec. 8, 1986

[51] Int. Cl.⁴ .............................................. B60R 19/08
[52] U.S. Cl. .................................... 293/126; 293/128
[58] Field of Search ................................. 293/126, 128

[56] References Cited

U.S. PATENT DOCUMENTS

| | | | |
|---|---|---|---|
| 3,861,728 | 1/1975 | Häferle et al. | 293/126 |
| 4,059,301 | 11/1977 | Meyer | 293/120 |
| 4,251,096 | 2/1981 | Stock | 293/126 |
| 4,629,232 | 12/1986 | Zimlich et al. | 293/128 |

Primary Examiner—Robert R. Song
Attorney, Agent, or Firm—Edward A. Craig

[57] ABSTRACT

A movable molding is provided for a vehicle on the vehicle body adjacent to a wrap-around end portion of the bumper. The molding and end portion of the bumper have mating abutment walls through which these elements are fastened together. When the bumper moves towards the vehicle upon impact, the molding is thereby caused to move therewith. Slide means are provided between the molding and vehicle body for sliding of the molding along the body. A cam surface is provided in the sliding structure which causes the end of the molding remote from the bumper end porton to move away from the vehicle body and thereby avoid damaging contact with any outwardly projecting vehicle body structure which lies in the path of the molding.

5 Claims, 8 Drawing Figures

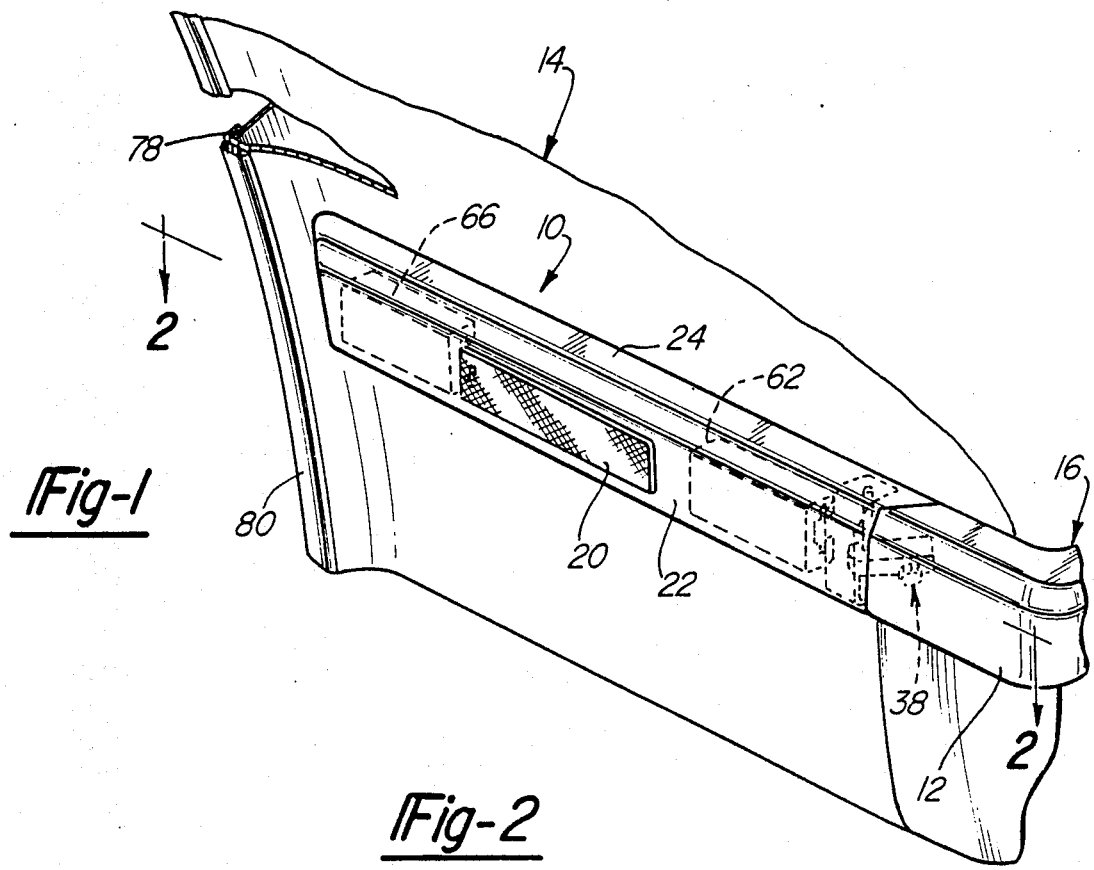
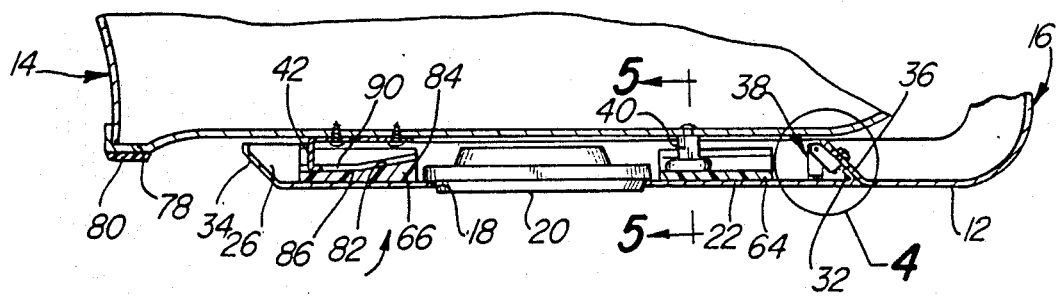
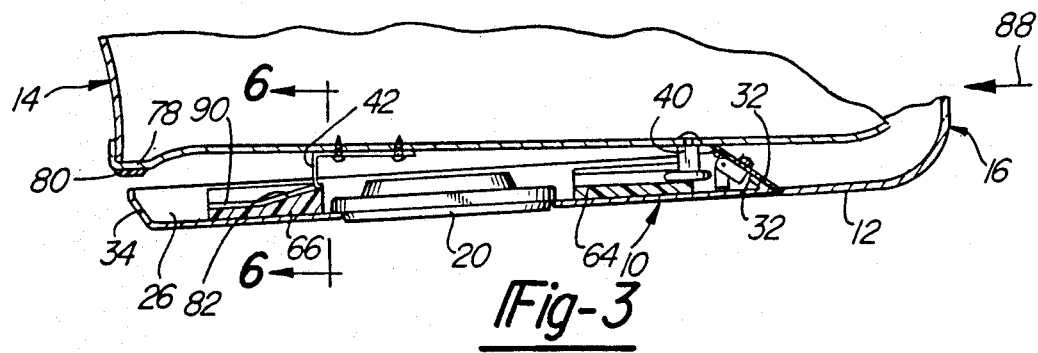

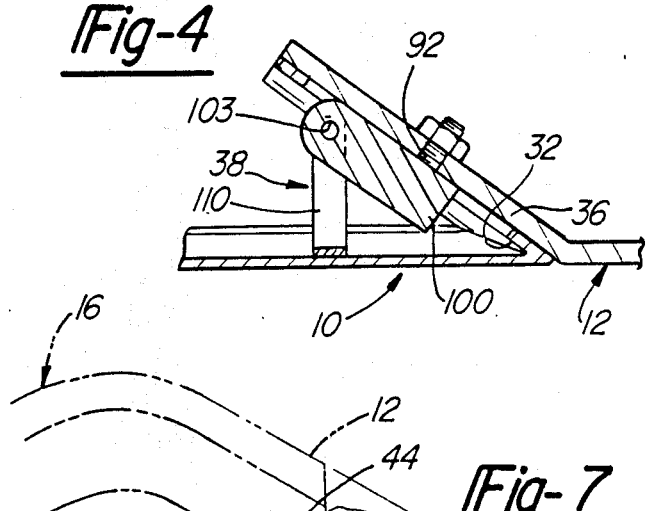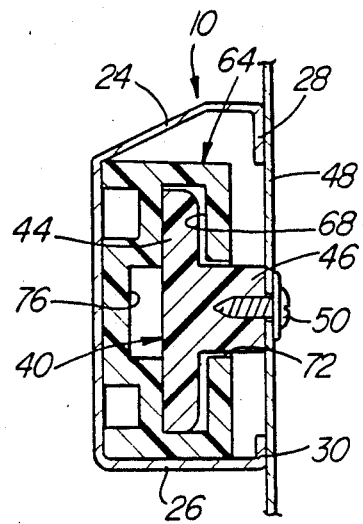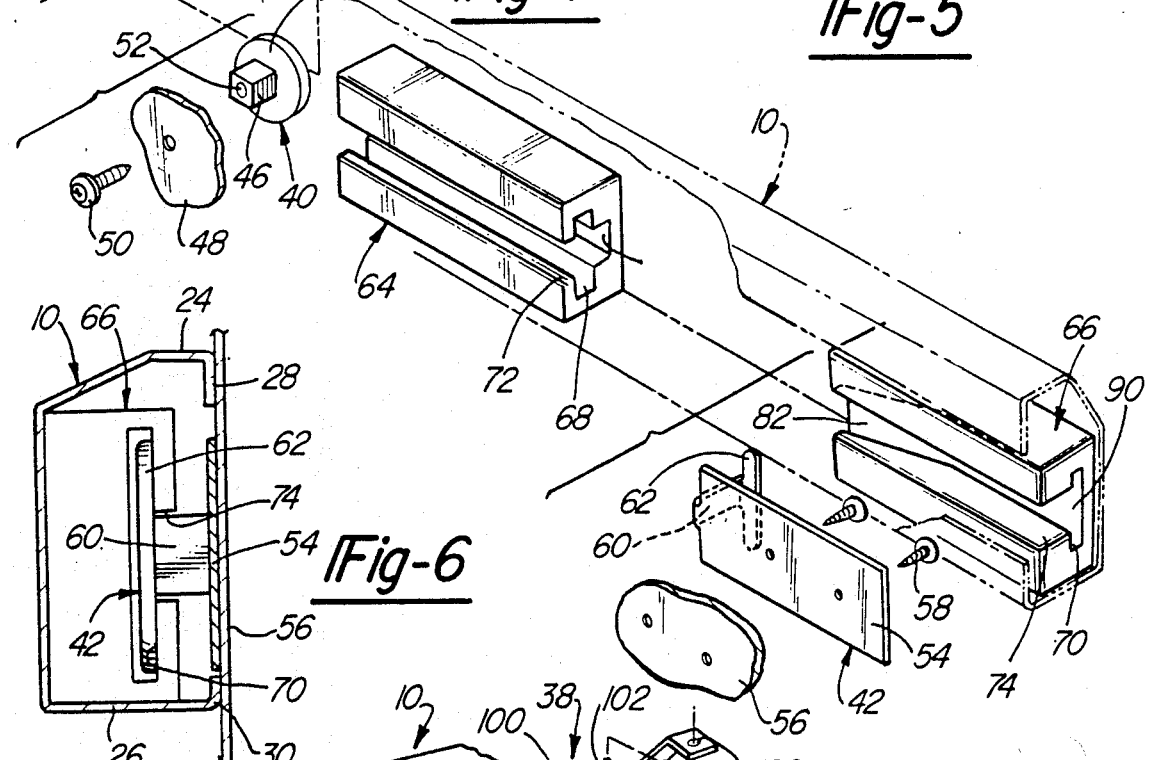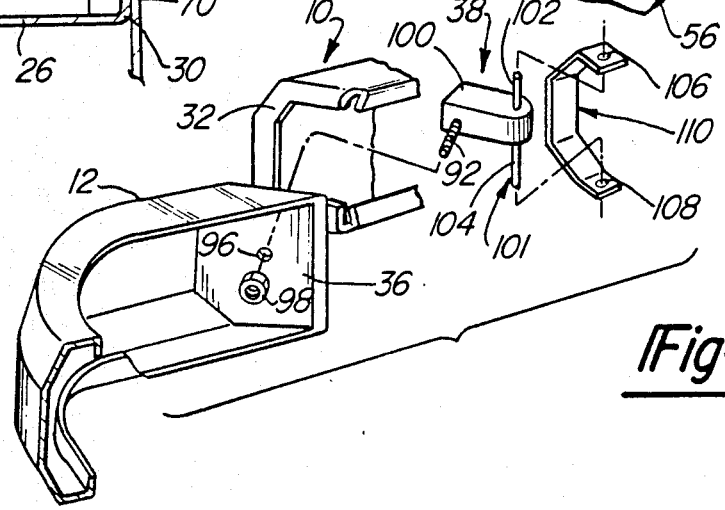

MOVABLE MOLDING FOR A VEHICLE

RELATED APPLICATION

This application relates to Ser. No. 939,194, filed 12-8-86.

BACKGROUND OF THE INVENTION

1. Field of the Invention

This invention relates to a movable vehicle molding directly connected to a bumper to move therewith and provided with cam means to cause outward deflection of the molding upon bumper movement, the outward deflection resulting in the molding passing over any outwardly projecting vehicle body structure without damaging it.

2. Prior Art

Government regulations have mandated that front and rear bumpers of vehicles be so constructed and mounted as not to be damaged as a consequence of low speed impact with other vehicles or fixed structure. The prevailing method for accomplishing this has been to mount the bumper onto the vehicle by means of an energy absorbing device, such as a shock absorbing structure. When the bumper is impacted at low speeds, the energy absorbing device collapses, absorbing the energy of impact. This collapse takes with it the bumper which moves toward the vehicle. After being impacted, the energy absorbing devices bias the bumper back to its normal position.

One problem which has been encountered in connection with such structures is the maintenance of the integrity of moldings typically provided on the fenders of vehicles adjacent to and in-line with wrap-around end portions of the bumpers which extend around the sides of the vehicles. As the bumper is moved toward the vehicle, the wrap-around end portions also, of course, move. These end portions will impact moldings which are mounted on the fenders closely adjacent thereto. If the moldings are rigid pieces, and rigidly mounted they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal position as a consequence of inherent resiliency. Examples of such moldings are illustrated in U.S. Pat. Nos. 3,937,508 and 4,059,301.

It has been desired to use a molding fabricated of rigid material. Such a molding will not, of course, flex upon being impacted by an end portion of a bumper. It is necessary that such rigid molding not be damaged by the bumper upon impact. In accordance with these needs, spring mounting means, as disclosed in U.S. patent application Ser. No. 06/776,077, filed Sept. 3, 1985, are provided to permit outward deflection of the molding upon bumper movement, with the end portions of the bumper sliding beneath the molding thereby avoiding damage to the molding.

However, this construction has one disadvantage. There is frequently a small amount of permanent bumper set after impact. Therefore, the molding has to be offset from the bumper a short distance so that it can return to its initial position after the bumper retracts to a position which is closer to the molding than the initial position of the bumper because of the small amount of permanent bumper set. This requires a short empty space or gap to be provided between the adjacent ends of the molding and bumper. This gap is considered to be aesthetically objectionable.

In accordance with another approach as disclosed in U.S. patent application Ser. No. 06/911,545, filed Sept. 25, 1986, the molding is provided with a spring urged, telescoping extension adjacent the bumper. This permits limited reduction in molding length upon impact of the bumper with the molding prior to deflection of the molding. Any permanent set of the bumper is taken up by the telescoping extension. This permits the molding to be mounted closely adjacent to the bumper end with no gap between these elements. However, this construction does require a spring assembly.

In accordance with the present invention, a slidable molding is provided with a simple cam arrangement which causes the molding to deflect over and pass outwardly projecting vehicle body structure without damage. The molding is directly connected to the bumper, thus leaving no gap therebetween. Novel fastening means are used for this connection to promote ease of assembly and permit vertical movement of the bumper while the molding remains stationary. Thus, if the bumper is moved up or down upon impact, it will not damage the molding.

SUMMARY OF THE INVENTION

A movable molding for a vehicle having a body and a bumper mounted on one of the forward and rearward ends thereof is provided. Energy absorbing structure mounts the bumper to the vehicle. The energy absorbing structure biases the bumper to a normal position but permits movement of the bumper toward the vehicle upon impact. The bumper has an end portion extending around a side of the vehicle body.

The molding comprises a relatively rigid element having an underside and exterior side. The molding lies on the exterior of the vehicle body in alignment with, and adjacent to, the bumper end portion. Fastening means secure the molding to the bumper end portion. Slide element means are connected to the vehicle body. One of the slide element means and molding have projection structure thereon and the other of the slide element means and the molding has longitudinally extending recess means thereon. The projection structure is received within the recess means and maintains the molding in position relative to the vehicle body while permitting the molding to slide in the direction of the bumper movement. The bumper end portion is adapted to move the molding on the slide element means when the bumper is moved toward the vehicle upon impact and move the molding back to its original position upon retraction of the bumper end portion after impact.

The recess means includes a cam surface angled outwardly from the vehicle from a point intermediate the ends of the molding to a point more remote from the bumper end portion. The cam surface contacts the projection structure during sliding of the molding and causes the end of the molding remote from the bumper end portion to move away from the vehicle body and thereby avoid damaging contact with any outwardly projecting vehicle body structure which lies in the path of the molding.

The molding has at least one block element on the underside thereof. The block element has the recess means formed therein. The slide element comprises a structure including an enlarged head and a stem. The recess means defined by the block element comprises an elongated vertically extending recess which receives the head and an elongated horizontally extending recess communicating therewith through which the stem extends. The cam surface is defined by the surface of the vertically extending recess of the recess means which is outermost from the vehicle body.

The fastening means comprises a fastening element extending from the interior of the molding through an open end provided in the molding and opening means provided in the bumper end portion. A base is slidably mounted on pin means the ends of which extend therefrom. The fastening element is secured to the base. A bracket is positioned within the molding and is capable of limited sliding. The bracket has opening means receiving the pin means to pivotably and slidably mount the base to facilitate orientation and passage of the fastening means through the opening means in the bumper end portion. The base can slide on the pin means to permit independent vertical movement of the bumper end portion.

DESCRIPTION OF THE DRAWINGS

FIG. 1 is a view in perspective of a portion of the right front fender and bumper area of a car with a movable molding forming one embodiment of the present invention illustratively mounted on the right front fender;

FIG. 2 is a sectional view taken substantially along the line 2—2 of FIG. 1 looking in the direction of the arrows;

FIG. 3 is a view similar to FIG. 2 with the bumper shown in a position where it has been moved toward the car after impact;

FIG. 4 is an enlarged view of the structure shown in the circle of FIG. 2 and labeled with the numeral 4;

FIG. 5 is a sectional view taken substantially along the line 5—5 of FIG. 2 looking in the direction of the arrows;

FIG. 6 is a sectional view taken substantially along the line 6—6 of FIG. 3 looking in the direction of the arrows;

FIG. 7 is an exploded view in perspective of portions of the molding structure viewed from the reverse position with respect to that shown in FIG. 1 to illustrate the backside of the components; and FIG. 8 is a perspective exploded view of the fastening means used to secure the molding to the bumper.

DETAILED DESCRIPTION OF A PREFERRED EMBODIMENT

Referring to FIG. 1, it will be noted that the movable molding 10 in accordance with the present invention is mounted on the side of the right front fender of an automobile 14. A similar molding may be mounted on the right rear fender. Mirror image moldings may be mounted on the opposite or left-hand side of the automobile 14. It will be noted that the molding 10 is mounted in-line with and adjacent to the end portion 12 of the front bumper element 16. This portion extends around the side of the vehicle.

The bumper elements are mounted on the automobile 14 for movement relative to the automobile body upon impact. Energy absorbing devices, such as shock absorbers, are provided to mount and bias the bumper elements to a normal position such, for example, as illustrated in the previously mentioned U.S. Pat. Nos. 3,937,508 and 4,059,301. The specific type of energy absorbing device is not germane to the present invention, the present invention functioning with various styles of such devices. The energy absorbing devices permit movement of the bumper a short distance toward the vehicle on which they are mounted after a low speed impact with another vehicle or stationery structure without appreciable damage to the bumper structure. After the impacting force is dissipated, the bumper structure is returned to its original position by the energy absorbing devices. However, in some cases of greater impact, the bumper structure may have a small amount of permanent set and consequently not return to its original position.

The movable molding of the present invention is designed to accommodate limited bumper motion without damage to the molding or adjacent vehicle body structure. The molding 10 is a relatively rigid trim piece designed to stylistic merge with the front bumper element. The molding 10 includes a rectangular opening 18 which surrounds a lens 20, usually amber in color, which is mounted on the automobile body structure. A lamp is provided behind the lens to illuminate the lens when the vehicle lights are energized. Such lamps are commonly referred to as "fender marker lamps" and the molding 10 as a "marker surround".

The molding 10 may be fabricated as, for example, a stamped brass element. The molding 10 is elongated in the direction of the length of the automobile 14. It includes an exterior side comprising an outer wall portion 22 from the edges of which depend side wall portions 24, 26 which space the outer wall portion 22 from the automobile body structure. The side wall portions 24, 26 terminate in inwardly turned flange portions 28, 30. The end of the molding adjacent to the bumper end portion 12 is provided with an abutment wall 32 in the form of a peripheral flange which leaves the end of the molding substantially open. The end of the molding 10 remote from the end portion 12 is closed by means of a wall 34. The bumper end portion 12 has a mating abutment wall 36. The walls 32, 36 contact each other at all times, being connected together by fastening means 38 as will be later described. As will be noted, no space is provided between the walls 32, 36. Such a space, which is visually objectionable, is normally needed to accommodate bumper movement but is avoided in the present construction.

The molding 10 lies on the exterior of the vehicle body and is held in place by slide element means which are connected to the vehicle body. The slide element means comprise a pair of projecting structures 40, 42. One of these structures 40 is mushroom shaped and includes a head 44 and a square stem 46. The structure 40 is secured to vehicle body structure 48 by means of a screw 50 which is received in opening 52 provided in stem 46. The other structure 42 is defined by a plate 54 which is secured to vehicle body structure 56 by means of screws 58. A stem 60 extends outwardly from one end of the plate 54 and terminates in an inturned enlarged head 62.

Each of the projecting structures 40, 42 is slidingly received in recess means provided in a pair of block elements 64, 66 which are secured within the molding 10 by means of adhesion and a press fit. Each of the blocks 64, 66 is provided with an elongated vertically extending recess 68, 70 which slidingly receives the heads 44, 62 and an elongated horizontally extending recess 72, 74 communicating therewith through which the stems 46, 60 extend. The block 64 has an additional recess 76 which functions as a frictional relief.

As will be appreciated, with the structure thus described, the molding 10 will move in whatever direction, that is forward or backward, the bumper structure moves. However, as will be noted in FIG. 1, there is frequently outwardly projecting vehicle body structure which lies in the path of the molding 10 which would be damaged if the molding moved directly thereinto. In the present case, there is an outwardly projecting lip 78 around the wheel well and a trim molding 80 mounted on the lip 78. It is not desired to damage this structure as a consequence of the movement of the molding 10 along with the bumper. Therefore, cam means are provided in the recess of the block 66 to cause the end of the molding 10 to move outwardly away from the vehicle body structure as it is pushed rearwardly by the bumper structure. The cam structure is defined by the surface 82 of the vertical recess 70 of the block 66, which cam surface is outermost from the vehicle body. As will be noted, the surface 82 is angled outwardly away from the vehicle from a point intermediate the ends of the molding, that is, point 84, to a point more remote from the bumper end portion, that is point 86. The cam surface 82 contacts the head 62 of the projecting structure 42 during sliding of the molding 10 and causes the end of the molding 10 remote from the bumper end portion to move away from the vehicle body as shown in FIG. 3 after the molding 10 has been slid in the direction of arrow 88. This causes the molding 10 to avoid impinging upon the lip 78 and trim molding 80 which project outwardly of the vehicle body around the wheel well. As will be appreciated, the bumper will be moved back to its normal position after impact, as illustrated in FIG. 2, and the molding 10 will be returned to its original position. If the bumper does not move all of the way back to its original position, it makes no significant difference because the relative position of the molding 10 with respect to the bumper structure will remain the same.

Of course, if there is a substantial deformation of the bumper position, the molding will remain in somewhat of the position of FIG. 3. However, this requires a greater impact upon the bumper than the present invention is designed to protect against. A portion of flat surface 90 is provided at the end of the cam surface 82 to accommodate some bumper lack of reset.

The fastening means 38 which secure the molding 10 to the bumper end portion 12 are best illustrated in FIGS. 4 and 8. As will be noted, the fastening means includes a fastening element 92 in the form of a threaded bolt. The bolt 92 extends through the open end of the molding and through opening 96 provided in abutment wall 36 of the bumper end portion 12. A nut 98 is received on the bolt and tightened in place to thereby secure the molding 10 to the bumper end portion 12. The bolt 92 is anchored to a base element 100. The base element 100 is positioned within the molding 10. Pin means comprising a single pin 101 slidably extending through an opening 103 in the base 100 has a pair of pin ends 102, 104 extending outwardly from the base 100. The pin ends 102, 104 are received in openings 106, 108 provided in a U-shaped bracket 110. The bracket 110 is slidably received within the molding 10. This sliding is limited by wall flange 32. Mounting of the base 100 in the bracket 110 permits pivoting of the base thereby changing the angular direction of the bolt 92 and vertical sliding of the base 100 on the pin 101 to facilitate orientation of the bolt with respect to the opening 96 and passage therethrough during assembly and permits vertical movement of the bumper with respect to the molding upon impact, with the molding remaining vertically stationary. The slidability of the backet 110 permits easy assembly of the fastening means structure to secure the molding 10 to the bumper end portion 12.

I claim:

1. A movable molding for a vehicle having a body and a bumper mounted on one of the forward and rearward ends thereof, energy absorbing structure mounting the bumper to the vehicle, said energy absorbing structure biasing the bumper to a normal position but permitting movement of the bumper toward the vehicle upon impact, said bumper having an end portion extending around a side of the vehicle body, said molding comprising a relatively rigid element having an underside and an exterior side, the molding lying on the exterior of the vehicle body in alignment with, and adjacent to, said bumper end portion, fastening means securing the molding to said bumper end portion, slide element means connected to the vehicle body, one of the slide element means and molding having projection structure thereon and the other of the slide element means and the molding having longitudinally extending recess means thereon, the projection structure being received within the recess means and maintaining the molding in position relative to the vehicle body while permitting the molding to slide in the direction of the bumper movement, the bumper end portion adapted to move the molding on the slide element means when the bumper is moved towards the vehicle upon impact and move the molding back to its original position upon retraction of the bumper end portion after impact, the recess means having a cam surface angled outwardly away from the vehicle from a point intermediate the ends of the molding to a point more remote from the bumper end portion, the cam surface contacting the projection structure during sliding of the molding and causing the end of the molding remote from the bumper end portion to move away from the vehicle body and thereby avoid damaging contact with any outwardly projecting vehicle body structure which lies in the path of the molding.

2. A molding for a vehicle as defined in claim 1, further characterized in that the molding has at least one block element on the underside thereof, the block element having the recess means formed therein.

3. A molding for a vehicle as defined in claim 2, further characterized in that the slide element comprises a structure including an enlarged head and a stem, the recess means defined by the block element comprising an elongated vertically extending recess receiving said head and an elongated horizontally extending recess communicating therewith through which said stem extends.

4. A molding for a vehicle as defined in claim 3, further characterized in that the cam surface is defined by the surface of said vertically extending recess of the recess means which is outermost from the vehicle body.

5. A molding for a vehicle as defined in claim 1 further characterized in that the fastening means comprises a fastening element extending through the enlarged opening in the molding and the opening means provided in the bumper end portion, a base having a pin extending vertically slidably therethrough with ends of the pin extending from the base, the fastening element being secured to said base, the molding having opening means on the underside thereof receiving said pin ends to pivotally and vertically slidably mount the base to facilitate orientation and passage of the fastening means through the opening means in the bumper end portion during assembly and permit vertical movement of the base on the pin to accommodate vertical movement of the bumper end portion upon impact, with the molding remaining vertically stationary.

* * * * *